(12) United States Patent
Sprenger

(10) Patent No.: US 9,102,778 B2
(45) Date of Patent: Aug. 11, 2015

(54) MODIFIED PHENOL RESINS

(75) Inventor: Stephan Sprenger, Oststeinbek (DE)

(73) Assignee: EVONIK HANSE GMBH, Geesthacht (DE)

(*) Notice: Subject to any disclaimer, the term of this patent is extended or adjusted under 35 U.S.C. 154(b) by 128 days.

(21) Appl. No.: 12/809,918

(22) PCT Filed: Dec. 22, 2008

(86) PCT No.: PCT/EP2008/011051
§ 371 (c)(1),
(2), (4) Date: Sep. 17, 2010

(87) PCT Pub. No.: WO2009/080357
PCT Pub. Date: Jul. 2, 2009

(65) Prior Publication Data
US 2011/0060105 A1    Mar. 10, 2011

(30) Foreign Application Priority Data
Dec. 20, 2007  (EP) .................................. 07024756

(51) Int. Cl.
C08L 53/00    (2006.01)
C08G 8/38    (2006.01)
C08G 8/28    (2006.01)
C08J 5/24    (2006.01)

(52) U.S. Cl.
CPC .. C08G 8/38 (2013.01); C08G 8/28 (2013.01); C08J 5/24 (2013.01); C08J 2361/04 (2013.01)

(58) Field of Classification Search
USPC .................................. 525/88, 92 H, 92 K, 95
See application file for complete search history.

(56) References Cited

U.S. PATENT DOCUMENTS

| | | | |
|---|---|---|---|
| 4,155,947 A | 5/1979 | Ambrose | |
| 4,291,148 A | 9/1981 | Yasui et al. | |
| 4,647,631 A * | 3/1987 | Noguchi et al. | ............... 525/510 |
| 5,215,608 A | 6/1993 | Stroud | |
| 5,478,885 A | 12/1995 | Masse | |
| 2002/0090823 A1 * | 7/2002 | Grubb et al. | .................. 438/699 |
| 2005/0008965 A1 * | 1/2005 | Tao et al. | ................... 430/270.1 |
| 2007/0020476 A1 * | 1/2007 | Kintzley et al. | ............ 428/537.1 |
| 2013/0292083 A1 * | 11/2013 | Ladegourdie et al. | ........ 164/349 |

FOREIGN PATENT DOCUMENTS

| | | |
|---|---|---|
| EP | 0 002 517 A | 6/1979 |
| EP | 0 043 935 A | 1/1982 |
| GB | 1 256 705 A | 12/1971 |
| GB | 2 026 497 A | 2/1980 |
| GB | 2 075 517 A | 11/1981 |
| JP | 55116718 | 9/1981 |
| JP | 57 070119 A | 4/1982 |
| JP | 57070119 * | 4/1982 |
| WO | WO 97/17385 | 5/1997 |

OTHER PUBLICATIONS

Sumitomo Bakelite, CAPLUS AN 1982:528583, abstracting JP 57070119, 4-1982.*
Ishii et al., tranlation of JP 5707119 (4-1982).*
Konrad Koszinowski: "Formaldehyd", in: RÖMPP Online, www.roempp.com/prod3/roemopp.php, Dec. 2011.

* cited by examiner

Primary Examiner — Jeffrey Mullis
(74) Attorney, Agent, or Firm — Henry M. Feiereisen LLC; Ursula B. Day

(57) ABSTRACT

Modified phenolic resins and processes for producing these are described, as also are phenolic-resin formulations which comprise the modified phenolic resins, and processes for producing these. Specific uses of appropriate phenolic resins and, respectively, phenolic-resin formulations, and the use of block copolymers for producing phenolic resins, are also described.

10 Claims, No Drawings

MODIFIED PHENOL RESINS

CROSS-REFERENCES TO RELATED APPLICATIONS

This application is the U.S. National Stage of International Application No. PCT/EP2008/011051, filed Dec. 22, 2008, which designated the United States and has been published as International Publication No. WO 2009/080357 and which claims the priority of German Patent Application, Serial No. 07 024 756.4, filed Dec. 20, 2007, pursuant to 35 U.S.C. 119(a)-(d).

BACKGROUND OF THE INVENTION

The present invention relates to modified phenolic resins, and also to processes for producing these. The present invention further relates to phenolic-resin formulations which comprise the modified phenolic resins, and also to processes for producing these. Finally, the present invention relates to specific uses of appropriate phenolic resins and, respectively, phenolic-resin formulations, and to the use of block copolymers for producing phenolic resins.

Phenolic resins are condensates of phenols with aldehydes, in particular with formaldehyde. Phenolic resins belong to the family of thermoset materials. In the hardened state, these have no melting point, because of three-dimensional crosslinking. Above a specific temperature threshold they begin to decompose. Phenolic resins are used as binders or glues or raw materials for producing molding compositions, electrical and thermal insulation materials, varnishes, frictional coatings, abrasives, timber-based materials, and fiber-based moldings. Phenolic resins are also used as foundry binders and refractory binders.

Significant application sectors for products produced with phenolic resins encompass the electrical, construction, and timber industry, vehicle construction, and also aerospace, the reason for this being that the materials have high strength, stiffness, and surface hardness, and also resistance to temperature change. Because of the low coefficient of thermal expansion, they are dimensionally stable and can withstand heating. Other features of phenolic resins are excellent fire- and flame-resistance, and also high electrical and thermal insulation capability.

In the synthesis of phenolic resin, the phenolic component and the aldehyde component react in a catalytic condensation reaction with elimination of water to give low-molecular-weight polymers. Decisive factors in determining the nature of a phenolic resin are not only the ratio of phenolic component to aldehyde component but also the selection of the catalyst. Acids are used as catalysts in the synthesis of novolaks. Bases are used for the resol condensation reaction.

However, a disadvantageous feature of the conventional phenolic-resin systems is that the phenolic resins often have a certain degree of undesired brittleness, therefore having only restricted extensibility.

WO 97/17385 discloses an arrangement for reducing brittleness, by modifying phenolic resins through incorporation of segments based on liquid rubbers. To this end, the liquid rubbers are reacted with formaldehyde or with derivatives thereof, and phenol or derivatives thereof, during synthesis of the phenolic resin. The result of this is chemical incorporation of the liquid rubbers into the structure of the phenolic resin. The rubber is generally incorporated here by way of a single bond at each of the two ends of the rubber molecule, and the two ends of the rubber molecules therefore bear functional groups, such as carboxy groups or amino groups.

The resultant phenolic resins are generally less brittle than the corresponding unmodified phenolic resins, since the lower density of the network results in a certain degree of flexibilization of the structure of the phenolic resin.

Examples of known liquid rubbers that can be used are the following materials containing functional groups: polybutadiene rubbers, acrylic butadiene rubbers, or silicone rubbers, and also vinylpyridine polymers or acrylic acid-butadiene-styrene polymers. Examples of functional groups in said liquid rubbers are hydroxy, carboxy, amino, or epoxy groups.

However, a disadvantage of said procedure is that the modification process has an adverse effect on the chemical and thermal aging of the phenolic resins. The strength of the resin can also decrease. Overall processability is impaired. The resin also has a very short shelf life.

There is also a process disclosed in JP 5770119 for phenolic resin production in which an intermediate is first provided, derived from liquid rubber and from an epoxy component. This then reacts in a second step with a precondensed phenolic resin. The intermediate reacts here with the phenolic resin primarily by way of its high content of reactive epoxy groups, apparent in terms of a measurable epoxy equivalent weight of about 1000 or less. This leads inter alia to further crosslinking of the phenolic resin, and this crosslinking in turn leads to very high viscosity of the precondensed phenolic resin. The high viscosity makes further processing of the phenolic resin more difficult; in particular during impregnation of textiles or of paper. The phenolic resin disclosed in said Japanese publication moreover lacks adequate shelf life. By way of example, phase separation is apparent after only a few days.

GB 2 075 517 A discloses a phenolic resin for which a liquid rubber is first reacted with a phenolic component, so that reaction with an aldehyde component can then give the phenolic resin. Polybutadienes are used as liquid rubbers here, and the phenolic component undergoes an addition reaction to the double bond of these.

The liquid rubbers therefore comprise aromatics which have random distribution across the polymer, where the liquid-rubber-polymer chains provide numerous possibilities of crosslinking in the context of phenolic-resin production. Here again, one problem inter alia is the increased viscosity of the resultant phenolic resin.

It is therefore an object of the present invention to mitigate at least one disadvantage of the prior art, and in particular to provide phenolic resins with reduced brittleness and therefore with increased extensibility, but in essence without any change in the aging properties. The phenolic resin should also have maximum end-use processability.

SUMMARY OF THE INVENTION

This object is achieved via a phenolic resin that includes a block copolymer, said block copolymer being a reaction product of a soft segment which is a liquid rubber with a hard segment which comprises aromatic units, wherein the phenolic resin is characterized by stable methylene bridges joined to said aromatic unit residue and formed by a chemical reaction of a phenolic compound with an aldehyde compound such that the block copolymer is incorporated into the phenolic resin by way of increased crosslinking. This object is also further achieved via a process which includes reacting the liquid rubber, as a soft segment with a hard segment having reactive aromatic units to form a block copolymer with aromatic units; reading the phenolic component with the aldehyde component in a condensation reaction to form a phenol-aldehyde condensate, wherein said aromatic units when reading with the aldehyde component are forming methylol groups that participate in the condensation reaction with the phenolic component and reaction of all phenol and aldehyde used to produce the resin takes place in the presence of the block copolymer; incorporating the block copolymer into the phenolic resin by way of the methylol groups that are forming stable crosslinks through methylene bridges between the phenolic compound and the block polymer resulting in a stabilized phenolic resin.

The invention has found that reduced brittleness, and therefore also increased extensibility, of the phenolic resin can be achieved via incorporation of aromatic segments in the form of block polymers into the structure of the phenolic resin. However, thermal and chemical aging resistance are retained.

The method used in the invention to integrate the segment based on aromatic units into the underlying structure comprises the presence, during production of the phenolic resin, of a rubber having aromatic units, in particular a liquid rubber. During production of the phenolic resin here, a reaction with the aldehyde component occurs at the aromatic rubber, with formation of methylol groups ($-CH_2OH$). Said methylol groups can then participate by analogy with the phenol itself in the condensation reaction to produce the phenol-aldehyde condensates. The result is incorporation of the block copolymer into the phenol-formaldehyde condensate (specifically by way of the methylol groups of the rubber). In contrast, according to the teaching of WO 97/17385, incorporation takes place by way of the corresponding hydroxy, carboxy, amino, or epoxy groups of the rubber, and according to the teaching of JP 5770119 it takes place by way of the epoxy groups of the rubber. The result is a change in the structure of the resultant phenolic resin in comparison with the prior art.

If rubbers having aromatic units are used as reactant alongside the phenol (derivative) and the formaldehyde (derivative) during synthesis of the phenolic resin, the result is that an aromatic reactant is supplied as further crosslinking reactant for the formaldehyde (derivative). This increases crosslinking density in comparison with phenolic resins of the prior art since specifically a plurality of chemical bonds are produced by way of the aromatic unit, in particular stable methylene groups. This crosslinking leads to modified morphology in comparison with the phenolic-resin systems known from WO 97/17385 A. The resultant morphology exhibits particularly good chemical and thermal aging resistance. There is also a marked improvement in the resistance values for the aging of the crosslinked systems when they are exposed to moisture.

Surprisingly, excellent extensibility (flexibilization) of the phenolic resins is also obtained, alongside said improved aging resistance values, although the former was not expected, because of the relatively large number of crosslinking points at the aromatic portion of the rubber incorporated into the structure of the phenolic resin.

The phenolic resins of the invention moreover have maximum shelf life. For the purposes of the present invention, shelf life means primarily good phase stability, i.e. that the phenolic resin exhibits no phase separation even after a prolonged period of storage at about 4 to 10° C., or else at room temperature. The phenolic resins of the invention advantageously have a shelf life of more than two days, or at least one week, and particularly more than two, or four, months at 4-10°, preferably 8° C., where this means that the phenolic resin exhibits no, or hardly any, discernible phase separation.

The fire performance of the phenolic resins of the invention advantageously corresponds in essence with that of the phenolic resins known hitherto. This applies not only to flammability but also to flame spread. In the event of a fire, the smoke density from the phenolic resins of the invention advantageously corresponds in essence to that from the phenolic resins of the prior art.

In one preferred embodiment of the present invention, the expression "rubbers having aromatic units" does not mean acrylic acid-butadiene-styrene polymers. Said polymers are mentioned in WO 97/17385 A; however, incorporation into the structure of the phenolic resin in that document does not take place by way of methylol groups formed via reaction with the aldehyde component, but instead by way of functional groups on the polymer.

The rubbers suitable for the present invention are reacted in the form of "soft segment" with a "hard segment" comprising reactive aromatic units, to give a block copolymer, which is then used in the synthesis of the phenolic resin. The block polymer is generally produced via reaction of rubbers with reactive aromatic systems.

The elasticity of the phenolic resin can be increased by increasing the content of segments comprising aromatic units in said resin.

The proportion of segments comprising aromatic units can be varied widely—as a function of the desired brittleness and, respectively, extensibility of the phenolic resin. However, it is preferable that the proportion of segments comprising aromatic units in the phenolic resin, based in each case on the total weight of the phenolic resin, is from 0.5 to 15% by weight, in particular from 1 to 10% by weight, particularly preferably from 2 to 8% by weight. Values of from 4 to 6% by weight are also possible.

The phenolic resin of the invention comprises, in each case based on the total weight of the phenolic resin, from 0.5 to 15% by weight, in particular from 1 to 10% by weight, particularly preferably from 2 to 8% by weight, of block polymer. The proportion can also be from 4 to 6% by weight. The proportion of block polymer is significant for achievement of a desired toughness with retention of adequate processability.

The phenolic resin produced is moreover particularly impact-resistant, by virtue of formation of segments of a rubber having aromatic units in the phenolic resin of the invention.

DETAILED DESCRIPTION OF PREFERRED EMBODIMENTS

Phenolic Component

Any desired aromatic compounds which bear a phenolic group can be used as phenolic compounds for the structure of the phenolic resin.

There is generally no particular restriction on the chemical structure of the phenolic compounds, and it is possible to use either mononuclear or polynuclear phenols. The mono- or polynuclear phenols can in turn be mono- or polyhydric, i.e. can bear one or more hydroxy groups.

Examples of suitable phenolic compounds can be selected from the group consisting of phenol; alkyl-substituted derivatives of phenol, e.g. o-, or p-cresol; phenols of relatively high alkylation level; halogen-substituted phenols, e.g. chloro- or bromophenol; polyhydric phenols, e.g. resorcinol or pyrocatechol; phenolic melamine; and polynuclear phenols, e.g. naphthols, bisphenol A, or bisphenol F.

Aldehyde Component

Any of the compounds of the general formula R—CHO can be used as aldehyde component in the phenolic resin. Appropriate aldehydes can be selected from the group consisting of formaldehyde, acetaldehyde, propionaldehyde, n-butyraldehyde, isobutyraldehyde, glyoxal, and furfural.

Formaldehyde is a preferred aldehyde which can be used for the purposes of the present invention. Formaldehyde can be used here in a form which does not cleave to give formaldehyde until the actual reaction has begun, or until a juncture shortly prior thereto. Examples here are paraformaldehyde and trioxane. Another preferred form of addition is that of an aqueous solution of formaldehyde (formalin).

Rubber Having Aromatic Units

The content of aromatic-rubber segments in the phenolic resin of the invention generally derives from a block copolymer which is used in the synthesis of the phenolic resins.

For the purposes of the phenolic resins of the invention, the content of aromatic-rubber segments provides a certain extensibility and therefore flexibilization of the resin, but does not simultaneously bring about disadvantages, in particular in respect of chemical and thermal aging.

The rubber having aromatic units can be used either for self-curing resins obtained using alkali-catalyzed condensation processes or for novolaks obtained using acid-catalyzed condensation processes, where these can be hardened by typical hardeners, such as hexamethylenetetramine.

For the purposes of the present invention, it is also possible to use, in phenolic resins, mixtures of appropriate rubbers having aromatic units. The block copolymers are generally produced from the reaction of reactive liquid rubbers (soft segment) with reactive aromatic systems (hard segment).

(i) Reactive Liquid Rubber (Soft Segment)

There is no particular restriction on the soft segment of the aromatic rubber which is incorporated into the structure of the phenolic resin for the purposes of the present invention, as long as the rubber is capable of reacting with the aromatic system. For this purpose, the reactive rubber preferably has at least one, in particular at least two, functional group(s). The rubber is preferably a flexible, long-chain molecule of moderate molar mass having reactive groups for reaction with the aromatic system. There is no particular restriction on the nature of the reactive groups, as long as the reactive groups of the rubber are capable of reacting with the aromatic system.

The molar mass of the rubber is preferably from 2500 to 8000 g/mol, particularly preferably from 3000 to 6000 g/mol, in particular from 3200 to 4500 g/mol. Phenolic resins of the invention using rubbers of this type are characterized by minimum viscosity and good impact-resistance properties.

Rubbers used can by way of example comprise functionalized homopolymers selected from the group consisting of homopolymers of butadiene, copolymers of butadiene with acrylonitrile, and terpolymers of butadiene, acrylonitrile, and acrylic acid. Said rubbers have, as functionalized end groups, carboxy, amino, or methacrylate groups. Corresponding rubbers are commercially obtainable by way of example from Emerald Performance Materials with trademark Hypro™ RLP (previously Hycar® RLP). The following grades are examples here: Hypro™ CTBN 1300×8, Hypro™ ATBN 1300×45, and Hypro™ VTBNX 1300×33.

Other examples of rubbers that can be used are carboxy-functional polybutadienes. Examples of suitable commercially available rubbers are Poly Bd® 45 CT and Poly Bd® R45HTLO (butadienes functionalized by hydroxy groups) respectively from Sartomer. It is also possible to use the epoxy- or acrylate-functional liquid polymers in the Poly Bd® product line.

Other examples of rubbers that can be used are carboxylated copolymers of acrylonitrile and butadiene, which are produced by Zeon Chemicals and marketed as Nipol®. One example is Nipol® 1072.

Other examples which incorporate a suitable soft segment into the resultant phenolic resin are hydroxy-functional rubbers, e.g. rubbers with trademark Krasol® LBH 2000, which are available commercially from Sartomer. These are butadiene homopolymers. Isocyanate-functional rubbers are also suitable, examples being rubbers with Krasol® LBD 2000 trademarks.

Maleic-acid-grafted liquid polybutadienes are also suitable as liquid rubbers for use in the invention. Ricon® 130MA13 from Sartomer is one example of this class of liquid rubbers.

(ii) Aromatic System (Hard Segment)

There is no particular restriction on the hard segment of the block copolymer used in the invention as long as it has at least one, preferably at least two, reactive group(s) which can react with the reactive groups of the rubber, and has aromatic content. The aromatic content of the hard segment permits incorporation of the block copolymer into the phenolic resin, in that the aldehyde component reacts not only with the phenol but also with the aromatic portion of the block copolymer during the synthesis of the phenolic resin, with formation of methylol groups. Said methylol groups then participate in the condensation reaction for producing the phenolic resin, by analogy with the phenolic component. The final result is incorporation of the block copolymer into the phenolic resin.

For the purposes of the invention, reactive aromatic systems are systems which contain reactive aromatics. Reactive aromatics here are aromatics which can function as reactant in the formation of the phenolic resin. Among these are by way of example oxygen-substituted aromatics such as those present in phenols or in bisphenols. However, the aromatics can also be activated via other substituents, such as substituents containing sulfur. It is preferable that the ortho- and/or para-position (based on the substituents to be activated) is unsubstituted in the reactive aromatics, thus permitting incorporation into the phenolic resin at said positions in the invention.

The aromatic system of the block copolymer can by way of example be selected from the group consisting of the condensates of epichlorohydrin and bisphenol, epoxidized novolaks, solid DGEBA resins, cresol-novolak epoxy resins, epoxidized cashew nut shell oils, tolyloxymethyloxirane, and phenalkamines, and aromatic anhydrides (e.g. phthalic anhydride, trimellitic anhydride, 3,4,3',4'-benzophenone tetracarboxylic anhydride, ethylene glycol bistrimellitate, and glycerol tristrimellitate).

The hard segments present in the block copolymer to be used in the invention can therefore by way of example be aromatic epoxy resins. Materials suitable for this purpose are by way of example the products of condensation of epichlorohydrin onto bisphenol systems, for example onto bisphenol A and bisphenol F. Examples of commercially available systems are a bisglycidyl ether of bisphenol A (e.g. Araldite® GY 250 from Huntsman), a bisglycidyl ether of bisphenol F (e.g. Epikote® 862 from Hexion), and epoxidized novolaks (e.g. DEN® 431 from Dow Chemicals).

It is also possible to use relatively high-molecular-weight derivatives, such as solid DGEBA resins (e.g. Epikote® 1001 from Hexion), or else cresol-novolak-epoxy resins (e.g. Araldite® ECN 9699 from Huntsman). Other aromatic systems, such as epoxidized cashew nut shell oil (e.g. Cardolite® NC 513 from Cardanol) or phenalkamines, are also suitable.

Other compounds which can be used as hard segment in the block copolymers are tolyloxymethyloxirane and aromatic anhydrides, such as phthalic anhydride, trimellitic anhydride, 3,4,3',4'-benzophenone tetracarboxylic anhydride, ethylene glycol bistrimellitate or glycerol tristrimellitate.

(iii) Production of the Block Copolymer to be Used in the Invention

The block copolymer to be used in the invention can be produced via the reaction of the rubber with the aromatic system. A requirement for this can be that the two components respectively have reactive functional groups, so that the block copolymer to be used in the invention is formed during the reaction by a reaction of said functional groups.

It is preferable that, in the block copolymer of the invention, the soft segment (S) has been linked terminally to one or two hard segments (H) (see variants (I) and (II) in the schematic representation below). It is also possible to use selection of suitable reaction parameters, for example an increase in the quantitative proportion of soft segment with respect to hard segment, to achieve an alternating sequence of soft and hard segment in production of the block copolymer (see variant (III) in the schematic representation below). In said alternating sequence, n is preferably from 1 to 3.

Schematic Representation of the Linkage Variants of the Block Copolymer

$$H—S \quad\quad (I)$$

$$H—S—H \quad\quad (II)$$

$$H—(S—H)_n \quad\quad (III)$$

The block copolymer of the invention is preferably a chain molecule, but it is also possible that branched, cyclic, or crosslinked structures are produced.

When starting materials that bear epoxy groups are used, it is advantageous that the epoxy equivalent weight (EEW) of the resultant block copolymer is more than 1000, preferably at least 1200 or 1500, and particularly preferably at least 2000 or at least 5000. The epoxy equivalent weight is a measure of the proportion of epoxy groups in a compound, based on weight. As the epoxy equivalent weight of the block copolymers increases, the proportion of epoxy groups decreases, and the incorporation of the block copolymer into the phenolic resin proceeds to a more pronounced degree by way of the reactive aromatics.

Known methods are available to the person skilled in the art for determining the epoxy equivalent weight. The determination is preferably carried out in accordance with the DIN standard 53 188 or, respectively, ISO 7142.

If a liquid rubber bearing carboxy groups is used, the acid number of the resultant block polymer is preferably less than 5, less than 3, or with preference less than 1 and with particular preference less than 0.5. The acid number is a measure of the proportion of acid groups, and states the weight of potassium hydroxide in mg required to neutralize 1 g of the test specimen. Processes available. The acid number is preferably determined in accordance with the DIN standard 53402 or the DIN standard EN ISO 2114.

The reaction takes place here under conditions appropriately adjusted for the respective systems used. The reaction conditions here therefore depend on the respective components of the reaction. The reaction generally takes place at temperatures in the range from 60 to 200° C. and preferably at temperatures below 140° C. The reaction here can be carried out with or without addition of a catalyst.

If catalysts are used for the purposes of the reaction, phosphorus compounds, such as triphenylphosphine, and tertiary amines, such as benzyldimethylamine, can be used.

The use of a catalyst is particularly preferred when the block copolymer is not directly used in the subsequent synthesis of the phenolic resin, since the use of catalysts during the production process can lead to low shelf life of the resultant block copolymers.

In a suitable method, if the block copolymer is stored until it is further processed, and/or if it is transported to the location of further processing, the block copolymer can be dissolved in a solvent which is not solely water. Preferred solvents here are water-miscible solvents which in particular can also be used in the production of the phenolic resin, examples being ketones, such as acetone and methyl ethyl ketone (MEK). The amount of solvent added can be minimized, in order to minimize the volume transported. It should however be sufficiently high to facilitate handling and further processing of the block copolymer (e.g. to give good pumpability). The proportion of the block copolymer in the solvent is advantageously from 30 to 90%, preferably from 40 to 85%, and particularly preferably from 50 to 80%.

Production of the Phenolic Resin of the Invention

The rubber having the aromatic units can be introduced into the initial charge for the production of the phenolic resin, and can then be reacted with the phenolic component and with the aldehyde component.

The production of the phenolic resins of the invention can be conducted in the manner known from the prior art, with use of acidic (novolaks) or basic catalysis (resols). The method uses a condensation reaction well known to the person skilled in the art from the literature, at an elevated temperature, for example at reflux temperature. Different phenolic resins are produced as a function of the nature of the catalyst, the amount added thereof, and also the temperatures used. The conduct of the appropriate condensation reactions is known per se to the person skilled in the art; in the production of the phenolic resins of the invention as in the prior art, the person skilled in the art can implement variations in the sequence of addition of the reactants, the temperature profile, and also the use of intermediate distillation steps.

It is preferable here that the phenolic component and the rubber having aromatic units are first used as initial charge and that the aldehyde component is then introduced. The aldehyde component here can be fed slowly into the initial charge which comprises the phenolic component and the rubber having aromatic units, or else be slowly liberated by an appropriate precursor compound.

In one particularly preferred embodiment, the production of the rubber having aromatic units and the production of the phenolic resin of the invention are carried out in a one-pot reaction. This means that the rubber first produced, having aromatic units, is directly used, i.e. in essence without work-up, isolation, or purification, for producing the phenolic resin of the invention, and/or is conducted in a single reaction vessel. To this end, after the production of the rubber, the phenolic component is admixed with the material, and then the aldehyde component is added, or is liberated from a precursor compound.

Resols and novolaks can be produced by using the rubber provided in the invention, having aromatic units.

If the intention is to produce novolaks, the phenolic component, the rubber having aromatic units, and the aldehyde component can be reacted with exposure to acid, in particular organic acids, such as oxalic acid.

If the intention is to produce resols, the phenolic component, the rubber having aromatic units, and the aldehyde component can be reacted with exposure to bases, in particular organic bases. In one preferred embodiment, the proportion of the rubber having aromatic units, based on the phenolic component or the aldehyde component, is from 0.5 to 15%, from 1 to 10%; or from 2 to 8%.

For the production of the phenolic resin, it is possible to use a solvent selected from the group consisting of water or alcohols, e.g. methanol, or a mixture thereof.

For the purposes of the present invention, the resin resulting from said reaction can then be distilled, so that solvent, phenolic content, content derived from the formaldehyde component, and also, if appropriate, further volatile components are at least to some extent, or else completely, removed from the reaction system. This removal of volatile constituents is a function of the desired application sector of the phenolic resins, that is not essential.

The use of a block copolymer during the production of the phenolic resin of the invention gives a transparent and homogeneous resin system which is suitable for further processing in a wide variety of processes and applications.

The phenolic resins of the invention can usually be characterized via measurement of viscosity, of solids content, via the content of free formaldehyde, and via the B time, which is determined by using a hotplate. The B time is the time required for complete crosslinking of the resin.

The resultant phenolic resins can, if appropriate, be subjected to further modification processes. By way of example, it is therefore possible to admix a solvent, such as methyl ethyl ketone (MEK), with the resultant phenolic resins. Particular application sectors can thus be rendered available to the phenolic resins of the invention.

The present invention further provides the phenolic resins obtainable by said process.

Phenolic-Resin Formulation

The present invention further provides phenolic-resin formulations which comprise the phenolic resins of the invention.

Other constituents of said phenolic-resin formulation can be other desired phenolic resins, and also further additions or additives.

The phenolic resins of the invention can also be used for modifying resin systems other than phenolic resins. To this end, the phenolic resins of the invention are formulated with the other resin systems, which by way of example can be melamine resins, urea resins, polyurethane resins, bismaleimide resins, and cyanurate resins.

The present invention therefore also further provides melamine resins, urea resins, polyurethane resins, bismaleimide resins, and cyanurate resins which comprise the phenolic resins of the invention, if appropriate in the form of a formulation.

Appropriate balancing of the individual constituents of the phenolic-resin formulations, in particular the blending of phenolic resins of the invention with standard resins, can control the toughness, brittleness, and flexibility of the corresponding phenolic-resin formulations.

Use of the Phenolic Resins and Phenolic-Resin Formulations of the Invention

The present invention further provides the use of the phenolic resins of the invention. The phenolic resins of the invention are generally useful wherever conventional phenolic-resin systems, i.e. phenolic resins produced without use of the rubber having aromatic units, are subject to restrictions in respect of toughness and flexibility.

The application sectors for the phenolic resins or phenolic-resin formulations of the invention are found by way of example in the sector of fiber-reinforced laminates, e.g. for producing panels for aircraft construction, and for the interior trim of rail vehicles.

Other uses are paper applications, for example in the production of paper-based laminates and of filters, and also timber applications, for example in the production of high-pressure laminates.

Other application sectors for the phenolic resins or phenolic-resin formulations of the invention are the production of frictional and abrasive coverings, of brake and clutch coverings, and of abrasive paper.

The phenolic resins and phenolic-resin formulations of the invention can also be used for applications in the sector of electronics and electrical engineering, in the construction of buildings, and for household devices, and also for applications in the foundry-industry sector. It is therefore possible to achieve a marked improvement in the respective property profiles of the final product.

The present invention further provides the use of rubber having aromatic units for producing phenolic resins.

The examples below provide further explanation of the present invention.

EXAMPLES

Production of a Block Copolymer (Example 1a) for Use in the Invention 8 kg of an appropriate reactive liquid rubber, Hypro CTBN 1300×8 (producer: Emerald Performance Materials, U.S.A), are used as initial charge in a 25 kg reaction vessel. Because the liquid rubber has high viscosity, it is preheated to from 50 to 100° C., to improve the metering process. 2 kg of a commercially available bisphenol A diglycidyl ether, e.g. Epikote® 828 (producer: Hexion, U.S.A.) or Araldite® GY 250 (producer: Huntsman, Switzerland) are then added. The reaction to give the copolymer is conducted for 2 hours at atmospheric pressure and 140° C.

This gives a high-viscosity block copolymer having an acid number <1; i.e. the carboxy groups previously present in the reactive rubber have reacted with epoxy groups. This is also confirmed by the epoxy equivalent, which is 1600. Viscosity is 3200 Pas (at 25° C.). The following other block copolymers were produced by using said procedure:

Example 1b 9 kg of Hypro™ CTBN 1300×8, 1 kg of Araldite® GY 250 EEW 7200, 8900 Pas Example 1c 7 kg of Hypro™ CTBN 1300×8, 3 kg of Araldite® GY 250 EEW 800, 1050 Pas Example 1d 8 kg of Hypro™ CTBN 1300×8, 2 kg of Cardolite® NX 476 FEW 14159, 140 Pas Example 1e 8 kg of Hypro™ CTBN 1300×8, 2 kg of Polypox® R6 EEW 1500, 64 Pas Example 1f 8 kg of Hypro™ CTB 2000×162, 2 kg of Araldite® GY 250 EEW 1550, 5400 Pas Example 1g 8 kg of Hypro™ CTBN 1300×31, 2 kg of Araldite® GY 250 EEW 1600, 2600 Pas Production of Phenolic Resins (Example 2a) Modified with Block Copolymers 10 kg of phenol, 14.66 kg of formalin (37% strength), 3.746 kg of water, and 0.5 kg of the block copolymer from example 1a are used as initial charge in a 25 kg reaction vessel. The mixture is homogenized for 60 minutes at 50° C. 0.38 kg of 50% strength sodium hydroxide solution is then added and the temperature is increased to from 80 to 85° C.

The condensation reaction is conducted for a period of 120 minutes. Water is then removed by distillation at a temperature of 50° C. under a vacuum of from 50 to 55 mbar until the desired solids content has been reached.

Comparative Example 2b

For comparative purposes, a phenolic resin is produced by analogy with example 2a), but contains no block copolymer. In the application examples it is termed "control".
Use of the Modified Phenolic Resins for Reinforcement of Paper Sodium kraft paper, weight per unit area 80 g/m², is impregnated firstly with the control from example 3, and secondly with the modified resin system from example 2. The test strips are fully hardened at 130° C. in an oven.

A breaking-load test gives an average value of 139.5 N for the control and 159.3 N for the modified system. This means that the phenolic resin modified with the block copolymers has markedly better elastic toughness properties.

What is claimed is:

1. A phenolic resin with increased crosslinked density, comprising: a block copolymer, said block copolymer being a reaction product of a soft segment which is a liquid rubber with a hard segment which comprises aromatic units, wherein the phenolic resin is characterized by stable methylene bridges joined to said aromatic unit residue and formed by a chemical reaction of a phenolic compound with an aldehyde compound, such that the block copolymer is incorporated into the phenolic resin by way of increased crosslinking, wherein the proportion of block copolymer in the phenolic resin is from 0.5 to 15% by weight, based on the phenolic component wherein the phenolic resin is transparent and homogenous and exhibits no phase separation within 2 months at 8° C.

2. The stabilized phenolic resin of claim 1, wherein the proportion of block polymer is from 4 to 6% by weight based on the phenolic component.

3. The phenolic resin as claimed in claim 1, wherein the rubber has been selected from the group consisting of homopolymers of butadiene, copolymers of butadiene with acrylonitrile, carboxy-functional, amine-functional, or methacrylate-functional homopolymers of butadiene, carboxy-functional, amine-functional, or methacrylate-functional copolymers of butadiene with acrylonitrile, carboxy-functional or methacrylate-functional terpolymers of butadiene, acrylonitrile, and acrylic acid, carboxy-functional, epoxy-functional, hydroxy-functional, and acrylate-functional polybutadienes, isocyanate-functional liquid rubbers, and maleic-acid-grafted polybutadienes.

4. The phenolic resin as claimed in claim 1, wherein the aromatic system has been selected from the group consisting of the condensates of epichlorohydrin and bisphenol, epoxidized novolaks, solid DGEBA resins, cresol-novolak epoxy resins, epoxidized cashew nut shell oils, tolyloxymethyloxirane, phenalkamines, and aromatic anhydrides.

5. The phenolic resin as claimed in claim 4, wherein an epoxy equivalent of the block copolymer is more than 1000.

6. The phenolic resin as claimed in claim 4, wherein an acid number of the block copolymer is less than 5.

7. The phenolic resin as claimed in claim 1, wherein the phenolic component is selected from the group consisting of phenol; alkyl-substituted derivatives of phenol, halogen-substituted phenols, polyhydric phenols, phenolic melamine and polynuclear phenols.

8. The phenolic resin as claimed in claim 1, wherein the aldehyde component is selected from the group consisting of formaldehyde, acetaldehyde, propionaldehyde, n-butyraldehyde, isobutyraldehyde, glyoxal, and furfural.

9. A stabilized phenolic resin obtained from liquid rubber, an aldehyde compound and a phenolic compound via a process which comprises the following steps:
  reacting the liquid rubber, as a soft segment with a hard segment having reactive aromatic units to form a block copolymer with aromatic units;
  reacting the phenolic component with the aldehyde component in a condensation reaction to form a phenol-aldehyde condensate, wherein said aromatic units when reacting with the aldehyde component are forming methylol groups that participate in the condensation reaction with the phenolic component and reaction of all phenol and aldehyde used to produce the phenolic resin takes place in the presence of the block copolymer;
  incorporating the block copolymer into the phenolic resin by way of the methylol groups that are forming stable crosslinks through methylene bridges between the phenolic compound and the block polymer resulting in a stabilized phenolic resin, wherein the proportion of block copolymer in the phenolic resin is from 0.5 to 15% by weight, based on the phenolic component, wherein the phenolic resin is transparent and homogenous and exhibits no phase separation within 2 months at 8° C.

10. The phenolic resin as claimed in claim 9, wherein the block copolymer is reacted without work-up, isolation, or purification wherein the two reaction steps proceed in a single reaction vessel.

* * * * *